United States Patent [19]

Wang et al.

[11] Patent Number: 4,876,474
[45] Date of Patent: Oct. 24, 1989

[54] COMMUTATOR

[75] Inventors: Patrick S.-C. Wang; Roger F. Baines, both of Repulse Bay, Hong Kong

[73] Assignee: Johnson Electric Industrial Manufactory, Limited, Chaiwan, Hong Kong

[21] Appl. No.: 244,612

[22] Filed: Sep. 9, 1988

Related U.S. Application Data

[63] Continuation of Ser. No. 79,017, Jul. 29, 1987, abandoned.

[30] Foreign Application Priority Data

Dec. 11, 1986 [GB] United Kingdom ............... 8629624
Mar. 16, 1987 [GB] United Kingdom ............... 8706162
Mar. 30, 1987 [GB] United Kingdom ............... 8707543

[51] Int. Cl.$^4$ ........................................... H02K 13/04
[52] U.S. Cl. ........................................ 310/236; 310/71
[58] Field of Search .................. 310/71, 232, 233, 234, 310/235, 236, 237; 439/391, 395, 396; 29/857–867, 597

[56] References Cited

U.S. PATENT DOCUMENTS

| 3,751,700 | 8/1973 | Cole | 310/236 |
| 4,035,908 | 7/1977 | Ishi et al. | 310/236 |
| 4,152,614 | 5/1979 | Noguchi et al. | 310/233 |
| 4,281,886 | 8/1981 | Kaplan | 339/97 R |
| 4,433,263 | 2/1984 | Longhouse et al. | 310/233 |
| 4,584,498 | 4/1986 | Strobl | 310/236 |
| 4,705,977 | 11/1987 | Shibata et al. | 310/235 |

FOREIGN PATENT DOCUMENTS

| 0043437 | 1/1982 | European Pat. Off. |
| 0122780 | 10/1984 | European Pat. Off. |
| 1459029 | 12/1976 | United Kingdom |
| 2084813 | 4/1982 | United Kingdom |
| 2134324 | 8/1984 | United Kingdom |

Primary Examiner—Peter S. Wong
Assistant Examiner—Judson H. Jones
Attorney, Agent, or Firm—Fleit, Jacobson, Cohn, Price, Holman & Stern

[57] ABSTRACT

A commutator comprises a commutator base, a plurality of commutator segments, and means securing the segments on the base. Each segment has an integral terminal provided with a slot which is open at one end for receiving a connector portion of an armature winding and which is arranged so as in use to straddle and grip the connector portion to electrically connect the commutator segment to the armature winding. The commutator is pre-assembled in that the segments and the commutator base are formed as a unit prior to mounting the commutator on the armature of a motor and can be connected to an armature winding by a mechanical connection without the application of heat.

14 Claims, 3 Drawing Sheets

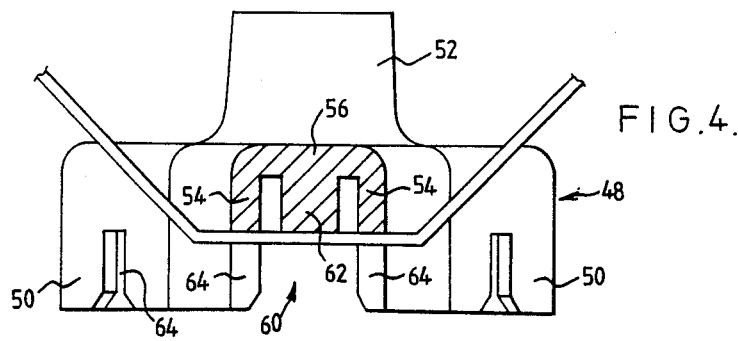
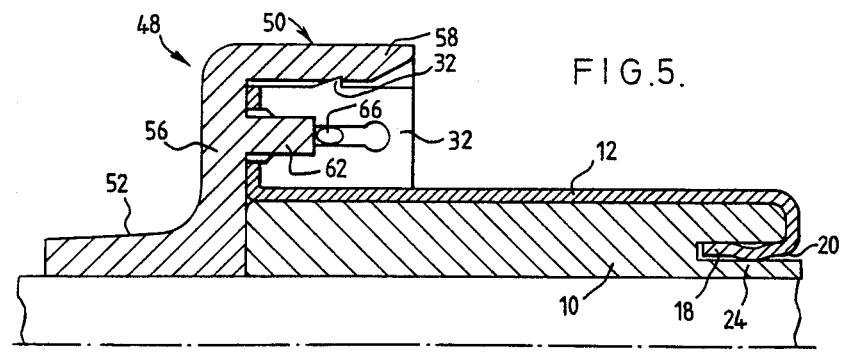
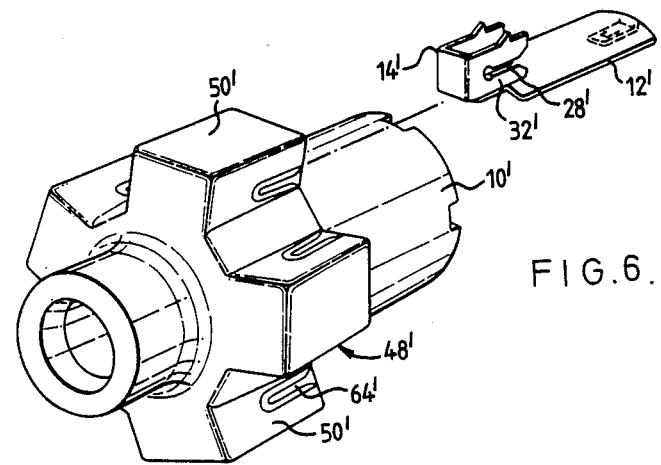

COMMUTATOR

This application is a continuation of application Ser. No. 079,017, filed July 29, 1987 now abandoned.

INTRODUCTION

This invention relates to a commutator for an armature of an electric motor.

BACKGROUND

In our British Pat. No. 2128818B we describe a connection between an armature winding and a commutator segment which avoids the application of heat to effect the connection and which utilises the principle of insulation displacement in which a wire having an insulating cover is forced into a slot narrower than the wire diameter to form a clean metal to metal contact between the wire and a terminal integral with the commutator segment.

In the aforesaid Patent the commutator segments are mounted on a base which includes a plurality of integral housings for receiving the aforesaid terminals. The commutator segments have to be attached to the base whilst the base is on the armature shaft.

SUMMARY OF INVENTION

According to the present invention, there is provided a pre-assembled commutator for an armature of an electric moor, comprising a commutator base, a plurality of commutator segments, and means securing the segments on the base, each commutator segment having an integral terminal provided with a slot which is open at one end for receiving a connector portion of an armature winding and which is arranged so as in use to straddle and grip said connector portion to electrically connect the commutator segment to the armature winding.

By "pre-assembled" we mean a commutator in which the segments and the commutator base are formed as a unit prior to mounting the commutator on the armature of a motor.

Preferred and/or optional features of the invention are set forth in claims 2 to 10, inclusive.

A commutator according to the invention can be made in isolation from the rest of an electric motor and can be connected to an armature winding without the application of heat to effect the connection. Moreover, in the case for example of a barrel-type commutator the commutator segments can be machined on the commutator base, if desired, to provide a right cylindrical surface for presentation, in use, to brush gear.

BRIEF DESCRIPTION OF DRAWINGS

The invention will now be more particularly described, by way of example, with reference to the accompanying drawings, in which:

FIG. 4 is a plan view of a terminal support which co-operates with the assembled commutator and which forms part of the armature, the support being shown partially sectioned to illustrate the configuration of one of its terminal housings, FIG. 5 is a vertical sectional view of the assembled commutator of FIG. 1 connected to the support of FIG. 4, and FIG. 6 is an exploded perspective view of an alternative embodiment of a pre-assembled commutator according to the invention.

DESCRIPTION OF PREFERRED EMBODIMENTS

Figure 1:
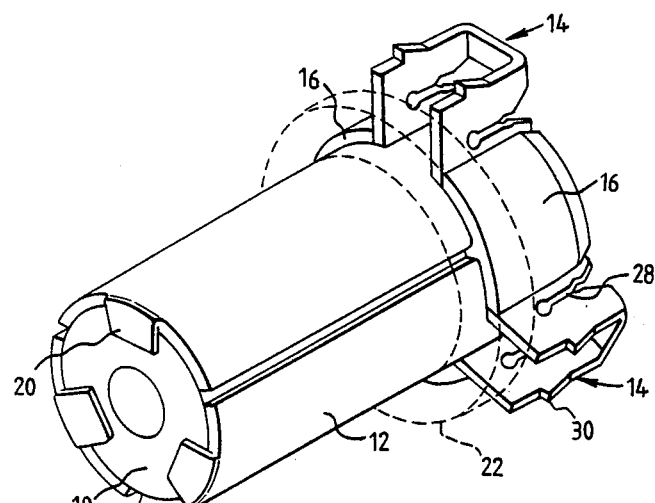
FIG. 1 is a perspective view of one embodiment of a pre-assembled commutator according to the present invention.

Referring firstly to FIG. 1, the commutator shown therein comprises a commutator base 10 preferably of thermosetting plastics material, such as a phenolic resin, or of metal coated with an insulating layer of metal oxide, e.g. anodised aluminium, and a plurality (as shown three) copper commutator segments 12, each having an integral terminal 14.

The base 10 is essentially right cylindrical and is provided with three arcuate radially outwardly extending ears 16 at one end, the ears 16 being equally spaced around the circumference of the base 10 to define recesses therebetween in which the terminals 14 of the commutator segments 12 are located.

The other end of the base 10 is provided with three longitudinal recesses 18 which are cut away at their outer ends to meet the cylindrical external surface of the base 10. These recesses 18 receive lugs 20 provided at the end of the segments 12 remote from the terminals 14 to assist in securing the segments to the base. As an alternative to the lugs 20 and recesses 18 the segments 12 could be provided with integral formations which fit over respective posts integral with said other end of the base.

A ring 22 is provided as a tight fit on the commutator segments 12 and is pushed down against the ears 16. This ring 22 further assists in securing the segments 12 to the base 10. This ring 22 could be snipped off after the commutator is connected to an armature of a motor or if made of resistive or electrically insulating material could be left on the commutator.

The segments 12 could also be bonded to the base 10. This would have the effect of rendering the segments more machinable. In this case, however, the undersides of the commutator segments are preferably textured to increase the surface area and provide pockets for the adhesive.

Figure 2:
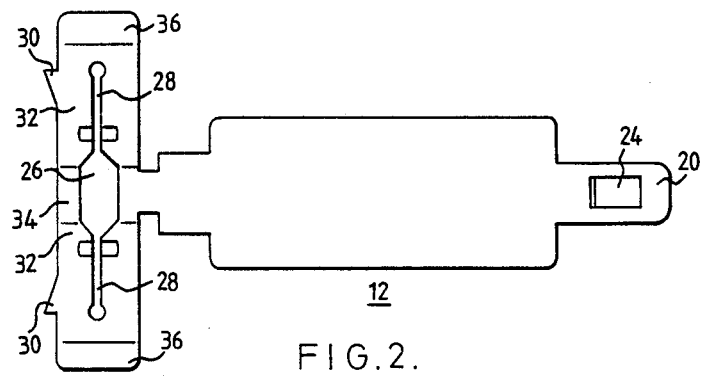
FIG. 2 is a plan view of a commutator segment and terminal in blank form.

A combined commutator segment 12 and terminal 14 is illustrated in FIG. 2 in the form of a blank. The lug 20 which is of reduced width is provided at the front end of the segment 12 and the lug 20 has a central struck-up tag 24 which is forced into the material of the base 10 so as to rigidly restrain the lug 20 within the recess 18 (FIG. 5). At its rear end, the commutator segment 12 is connected to the terminal 14. The terminal 14 is rectangular with its minor axis coincident with the longitudinal axis of the commutator segment 12. The terminal 14 has a central cut out portion 26 which is symmetrical with respect to both the major and minor axis of the terminal 14. The cut out 26 reduces from its largest width at the centre of the terminal to two key hole shaped cut out portions 28 which terminate either end of the cut out 26. A triangular barb 30 is provided on either side of the minor axis of the terminal 14 along the edge furthest from the commutator segment 12.

As can be seen from FIG. 1, the commutator segment 12 is of arcuate form which conforms to the external radius of the cylindrical base 10. The lug 20 extends below and back along the length of the commutator segment 12 with the tag 14 projecting below the lug 20.

Terminal 14 is bent upright from the commutator segment 12 and arms 32 of the terminal 14, which include the respective key hole shaped portions 28, are bent at 90 degrees to the central portion 34 of the terminal. The arms 32 therefore extend parallel to each other and to the longitudinal axis of the commutator segment 12, and forward along the length thereof. The free ends 36 of the terminal 14 are bent so as to be inclined towards each other when the arms 32 have been bent parallel to each other.

Figure 3:
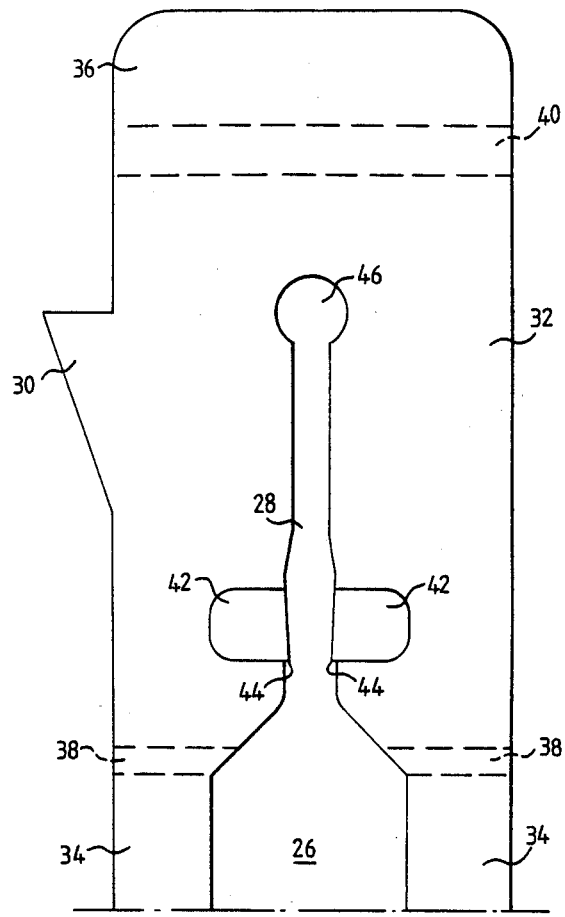
FIG. 3 is an enlarged view of one portion of the terminal shown in FIG. 2.

FIG. 3 shows one half of the terminal 14 of FIG. 2, on an enlarged scale. Areas 38 are shown in which bending occurs between the central portion 34 and the arm 32. Area 40 is also indicated in which bending between the arm 32 and the extreme end portion 36 occurs. However, the main purpose of FIG. 3 is to illustrate the detailed structure of the key hole shaped cut out portion 28. It is this feature which ensures contact with the armature winding. The reduction in size from the centre of the cut out 26 to the start of the key hole portion 28 provides a funnel for guiding the arm 32 onto a portion of the winding. A short distance into the key hole portion 28 there are located two cutters 42 which have sharp edges 44 projecting into the cut out 28. Preferably, the cutters are formed by a precise stamping operation. Alternatively, as shown the cutters 42 are formed from the arm 32 and partially severed therefrom such that the sharp edges 44 are resiliently urged into the cut out 28. Along the cut out 28, behind the cutters 42, there is a further small reduction in width. Circular end 46 of cut out 28 ensures that the edges of the cut out 28 have a certain resilience to separation by the winding portion.

FIGS. 4 and 5 show a terminal support which cooperates with the assembled commutator and which forms part of the motor armature. This support is in the form of a body 48 of moulded thermoplastics material, e.g. thermosoftening nylon. The body 48 is mounted fast on the shaft (not shown) of an armature of an electric motor and comprises three housings 50 and a sleeve portion 52 which serves to space the housings 50 from the base of the armature stack (not shown).

The three housings 50 are equally spaced around the circumference of the body 48. Each of the housings 18 is used in effecting connection between a respective portion of the armature winding and one of the commutator segments 12.

One of the housings 50 is shown in section in FIG. 4. The housing has side walls 54, an end wall 56 and a cover 58. The end wall 56 is adjacent the sleeve portion 52 and an opening 60 faces away from the sleeve portion 52. The side walls are parallel with the longitudinal axis of the body 48.

A boss 62 projects centrally from the internal surface of the end wall 56 and extends within the housing 50 for approximately half the length of the side walls 54. The boss 62 extends parallel with the longitudinal axis of the body 48 and is only connected to the body 48 by the end wall 56. Each side wall 54 of the housing 50 has a slot 64 which extends parallel to the longitudinal axis of the body 48, from the open end of the housing 50 for a length which terminates at the level of the free end of the boss 62. A portion 66 of the armature winding is passed through the slots 64 of one of the housings 50 and the winding portion 66 rests on the end of the boss 62. The external surfaces of the side walls 54 are bevelled so as to facilitate entry of the winding portion 66 into the slots 64.

The armature may be assembled as follows:

The body 48 is first placed on the armature shaft with the sleeve portion 52 against the base of the lamination stack. The lead wire of the armature winding is inserted into the housing 50 by laying the end of the wire 66 in the slots 64 provided in the side walls 54 of the housing.

The wire 66 is drawn back into the housing 50 until it rests against the boss 62. From this start, the first armature coil is wound. At the end of the first coil winding the armature is indexed and the wire 66 is layed in the same manner in the next housing 50 without breaking the continuity of the wire 66.

This process is repeated until all coils have been wound and the tail end of the winding is then laid in the slots 64 of the first housing 50 and pushed back until it is adjacent to the lead end which was placed against the boss 62 at the beginning of the winding operation. The wire 66 is then cut and the armature removed from the winding machine.

The body 48 now has a winding portion 66 comprising insulated wire (e.g. enamel coated wire) laying in each of the housings 50. Each of the winding portions 66 is under tension and is pulled tight against the respective boss 62.

The commutator which has been pre-assembled is then slid along the armature shaft with the terminals 14 aligned with the housings 50. As the terminals 14 approach the winding portions 32 held in the housings 50, the slots provided by cut outs 28 move over the wires 66. The sharp edges 44 of the cutters 42 sever the insulation on the wires 66 which is deformed as the slots, which are formed by cut outs 28 and which are narrower than the wire diameter, move over the wires 66. Intimate metal to metal contact is thereby provided between the wires 66 and the terminals 14.

The ears 16 enter into the body 48 between the housings 50. The barbs 30 grip the cover 58 of the housing 50 and therefore retain the terminal 14 within the housing 50.

The pre-assembled commutator shown in FIG. 6, differs from that described above primarily in that the base 10' and body 48' are formed as a unitary plastics moulding, the arms 32' of the terminals 14' have keyhole shaped slots 28' which are open at the free end of the respective arm 32', and the housings 50' have no bosses 62. The housings 50' are hence an integral part of the commutator base 10' and the terminals 14' are located in the housings 50' before mounting the commutator on a motor armature. In this case, however, the commutator must be mounted on the armature shaft before winding the armature. The connection portions of the winding are drawn into the key-hole shaped slots 28' and the slots 64' of the housings during winding, the connection portions being prevented from entering the circular end portions of the slots 28' by the inner ends of the slots 64'. Also the commutator of FIG. 6 is a five segment commutator having an appropriate number of housings 50'.

The above embodiments are given by way of example only and various modifications will be apparent to persons skilled in the art without departing from the scope of the invention defined by the appended claims. For example, the commutator segments could be secured to the commutator base solely by bonding or by moulding the base in a mould containing the commutator segments. If bonded to the commutator base, the undersides of the commutator segments are preferably textured as aforesaid, to assist bonding. The terminals 14 may be designed with only one arm 32 or may have more than two arms 32. Instead of the barrel commutator shown, the commutator may be a face commutator with the commutator segments arranged in a single plane perpendicular to the axis of the armature. Furthermore, the connection portions of the winding may be pre-stripped of insulation thus avoiding the need to provide cutters 42.

This invention is applicable particularly but not exclusively to a commutator of a fractional horsepower electric motor.

What is claimed is:

1. A rotatable pre-assembled commutator assembly, for connection to a rotatable armature of an electric motor having a winding including connector portion, said commutator assembly consisting essentially of:
    a commutator base;
    a plurality of commutator segments carried by said base and means securing said segments to said base;
    on each said segment, a terminal integral therewith, each said terminal having, extending inwardly of said terminal from a side thereof, a slot which has an open end at said terminal side and is adapted to straddle and grip a respective said winding connector portion;
    whereby said commutator assembly is connectable to said armature winding by relative bodily movement of said commutator assembly and said armature for engaging all said terminal slots over respective winding connector portions.

2. The commutator assembly of claim 1 in which each said terminal extends radially relative to the commutator segment and said terminal side is substantially radial.

3. The commutator assembly of claim 1 in which each said slot extends substantially parallel to the axis of rotation of said assembly whereby said assembly is connectable to a said armature winding by bodily relative movement thereof along a common rotation axis of said assembly and armature.

4. In combination, a rotatable pre-assembled commutator assembly and a terminal support, for connection to a rotatable armature of an electric motor having a winding including connector portions, said commutator assembly consisting essentially of:
    a commutator base;
    a plurality of commutator segments carried by said base and means securing said segments to said base;
    on each said segment, a terminal integral therewith, each said terminal having, extending inwardly of said terminal from a side thereof, a slot which has an open end at said terminal side and is adapted to straddle and grip a respective said winding connector portion;
    said terminal support being separate from and mountable coaxially with said assembly on an armature shaft in use, said terminal support having a plurality of housings corresponding respectively to said terminals and each adapted to receive a respective said terminal;
    said terminal support having means for receiving and locating in said housings a respective said connector portion of an armature winding disposed coaxially therewith in use;
    whereby said commutator assembly is connectable to a said armature winding by relative bodily movement of said commutator assembly on the one hand and said terminal support and said armature on the other hand for engaging all said terminal slots over respective winding connector portions disposed in said housings.

5. An electric motor armature comprising, in combination, a winding including connector portions and a rotatable pre-assembled commutator assembly, said pre-assembled commutator assembly consisting essentially of:
    a commutator base;
    a plurality of commutator segments carried by said base and means securing said segments to said base;
    on each said segment, a terminal integral therewith, each said terminal having, extending inwardly of said terminal from a side thereof, a slot which has an open end at said terminal side and which straddles and grips a respective said winding connector portion;
    said commutator assembly having been connected to said armature winding by relative bodily movement of said commutator assembly and said armature for engaging all said terminal slots over respective winding connector portions.

6. An electric motor armature as claimed in claim 5 further including a terminal support separate from said commutator assembly and mounted coaxially with and between said assembly and said armature winding;
    said terminal support having a plurality of housings each accommodating a said terminal and each provided with means locating a said winding connector portion extending across said housing;
    said armature having been assembled by forming said armature winding, disposing said connector portions thereof across said housings, and effecting coaxial relative bodily movement of said commutator assembly on the one hand and said terminal support and armature winding on the other hand to engage said terminal slots over said winding connector portions.

7. A rotatable pre-assembled commutator assembly, for connection to a rotatable armature of an electric motor having a winding including connector portions, said commutator assembly consisting essentially of:
    a commutator base;
    a plurality of commutator segments carried by said base and means securing said segments to said base;
    a terminal support integral with said commutator base at an end of said base and coaxial therewith, said terminal support having a plurality of housings distributed about the circumference thereof;
    on each said segment, a terminal integral therewith, each said terminal having, extending inwardly of said terminal from a side thereof, a slot which has an open end at said terminal side and is adapted to straddle and grip a respective said winding connector portion;
    each said terminal being disposed in a respective said housing with said open end of said slot thereof accessible;
    whereby in use said assembly is connectable to a said armature winding by forming said winding contiguous to and coaxially with said assembly with said connector portions thereof being laid into said slots.

8. The commutator assembly of claim 7, wherein:
    each said housing is open on the side thereof adjacent said commutator segment;
    each said terminal extends radially outwards of said segment, said side of said terminal is a side thereof adjacent said segment, and said slot extends generally parallel to the axis of said assembly from said terminal side towards the interior of said housing.

9. An electric motor armature comprising a winding including connector portions; and a pre-assembled commutator assembly consisting essentially of:
   a commutator base;
   a plurality of commutator segments carried by said base and means securing said segments to said base;
   a terminal support integral with said commutator base at an end of said base and coaxial therewith, said terminal support having a plurality of housings distributed about the circumference thereof;
   on each said segment, a terminal integral therewith, each said terminal having, extending inwardly of said terminal from a side thereof, a slot which has an open end at said terminal side and straddles and grips a respective said winding connector portion;
   each said terminal being disposed in a respective said housing with said open end of said slot thereof accessible;
   said armature having been formed by forming said winding contiguous to and coaxially with said commutator assembly with said connector portions thereof laid into said slots.

10. An armature comprising a winding having a connector portion, an armature termination, and a support on which said termination is mounted, said termination having an integral terminal provided with a slot which straddles and grips said connector portion, the slot having an open end for receiving a connector portion of said armature winding after the armature termination has been mounted on said support and two edges for gripping and electrically contacting the connector portion as it is drawn into the slot to establish electrical contact between the connector portion and the terminal, the slot maintaining said electrical contact as it straddles and grips said connector portion, wherein the open end of said slot faces away from said armature winding.

11. An armature as claimed in claim 10, wherein said terminal has at least two parallel arms each having a slot which straddles and grips said connector portion.

12. An armature as claimed in claim 11, wherein said two arms are connected by a transverse portion.

13. An armature as claimed in claim 10, wherein the support includes a housing for said terminal.

14. An armature as claimed in claim 13, wherein said terminal is provided with a barb for retaining said terminal in said housing.

* * * * *